3,141,870
HETEROGENEOUS COPOLYMERS OF ETHYLENE-ACRYLIC ESTERS
Oliver de S. Deex, Dayton, Ohio, assignor to Monsanto Company, St. Louis, Mo., a corporation of Delaware
No Drawing. Filed Jan. 3, 1961, Ser. No. 79,976
4 Claims. (Cl. 260—86.7)

The present invention relates to a process for preparing heterogeneous ethylene copolymers. In particular, the invention relates to a process of continuously polymerizing ethylene and acrylate or methacrylate esters under conditions such that non-homogeneous copolymers are obtained, and to certain polymers resulting from such a process.

The present invention is directed to a process of continuously polymerizing ethylene and certain amounts of acrylate or methacrylate esters in a tubular reactor and continuing the polymerization to conversions such that during the latter stages, unreacted monomer is substantially all ethylene. The invention is particularly directed to a process of polymerizing ethylene and acrylate or methacrylate esters, the acrylate or methacrylate esters constituting 6% to 20% by weight (calculated as methyl methacrylate) of the monomers, by conducting same at about 150 to 250° C. under a pressure of 20,000 to 40,000 p.s.i. and in the presence of a free radical catalyst through a small diameter tubular reactor of length such that at least 20% and preferably 30 to 40% by weight of the monomers are converted to polymer.

The acrylate or methacrylate esters utilized in the present invention are the lower alkyl esters. The acrylic and methacrylic acids themselves can also be utilized. The lower alkyl esters and the acids generally employed have the structural formula:

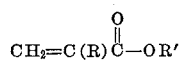

in which R is H, or $CH_3$, and R' is a lower alkyl group of 1 to 6 carbon atoms, e.g., methyl, ethyl, n-propyl, isopropyl, butyl, isobutyl, amyl, hexyl, etc., or hydrogen.

It is often desirable in the preparation of copolymers to obtain a very uniform distribution of the different monomeric units. It has been found, in the present polymerization, however, that improvement in some properties is achieved by making the distribution of the monomeric units very non-uniform, i.e., heterogeneous. During the early stages of the polymerization according to the present invention, the acrylate or methacrylate ester enters the polymer at a much more rapid rate than the ethylene, perhaps 5 to 10 times as fast. Then, in the later stages, as the supply of acrylate or methacrylate ester becomes nearly exhausted, the monomer polymerizing is substantially all ethylene. With the amounts of acrylate or methacrylate esters employed herein, it is generally necessary to continue the polymerizations to conversions greater than 20% to achieve desired degrees of heterogeneity, and if substantial amounts of nearly homopolymeric polyethylene are to be present, it will be necessary to exceed conversions of 30% or 40%, depending upon how substantial a portion of the acrylate or methacrylate ester was originally present.

In effecting the polymerization in a tubular reactor according to the present invention, both ethylene and comonomer are admitted at the inlet end of the reactor, and the polymerization occurs as the reaction stream is passed through the tube for a sufficient time to achieve the specified conversions. If desired, additional increments of ethylene can be added at injection points downstream from the inlet end of the reactor, preferably at points such that the acrylate or methacrylate ester in the stream has become substantially exhausted.

The procedure of the present invention makes it possible to prepare ethylene/acrylic ester and ethylene/methacrylic ester polymers having improved low temperature brittleness and other properties. The term "polymer" is used herein in a generic sense to include mixtures or polyblends of copolymers and homopolymers. It will be realized that the polymers will, in general, include a range of copolymers differing in the ratios of ethylene to comonomer. In some respects, such copolymers are so compatible with each other that their mixtures do not greatly resemble true polyblends of dissimilar polymers. In other respects, however, the properties of the copolymers augment each other as in a polyblend. It will be appreciated that the polyblend character of the polymers is accentuated at higher conversions, particularly at conversions such that fairly large amounts of substantially homopolymeric polyethylene are produced. The acrylate or methacrylate ester component of the copolymer will generally be present in minor amounts by weight. Heterogeneous ethylene/acrylic ester and ethylene/methacrylic ester copolymers having from 6% up to 50% by weight of the comonomer (calculated as methyl methacrylate) are of interest, but the effect of the heterogeneity will probably be most significant in the copolymers having 6% to 25% by weight of such comonomer, and heterogeneous polymers of particular interest herein are characterized by a melting point greater than 110° C., and a brittle temperature ($T_f$) no higher than —20° C. The stated 6% to 25% range involves copolymers of substantially crystalline character, while above 25% or so, the copolymers become progressively more non-crystalline in character while their rubbery properties increase. The existence of crystallinity is determinable to some extent by the presence of a sharp melting point, but even the rubbery copolymers prepared according to the present invention will generally have such heterogeneity that long hydrocarbon chains therein cause sharp melting points. In terms of mole ratios, the amounts of acrylate or methacrylate ester in the polymer range from about 1.7 to 15 moles per 100 moles of ethylene, or in a more prescribed range of 1.7 to 7 moles per 100 moles of ethylene. In preparing polymers of such composition, about 1.7 to about 6 moles of acrylate ester will be employed per 100 moles ethylene.

The present invention is illustrated by the following examples:

Example 1

A number of polymerization runs were made employing a 3/32 inch internal diameter reactor which was 42 ft. long, at a flow rate of 2.5 to 3.5 lb./hr. for a dwell time of 1.8 to 3.3 minutes. As initiator, 200 weight parts per million, based on ethylene, of t-butyl peracetate was employed. Results were as follows:

| Run No. | 1 | 2 | 3 | 4 | 5 | 6 |
|---|---|---|---|---|---|---|
| Wt. percent methyl methacrylate (feed) | 6 | 10 | 12 | 13 | 13 | 20 |
| Wt. percent Acetone | 4 | none | none | none | 12 | none |
| Conversion (percent) | 37 | 22 | 28 | 27 | 20 | 28 |
| Wt. percent MMA in off gas (calc.) | none | 2 | 0.3 | 2 | 3 | 7 |
| Wt. percent MMA (polymer) | 21 | 28 | 40 | 49 | 53 | 75 |
| Tensile Strength (p.s.i.) | 1,180 | 940 | 500 | 340 | 350 | 2,090 |
| Elong. (percent) | 630 | 400 | 450 | 600 | 450 | 280 |
| Density (g./ml.) | 0.944 | | 0.975 | | | |
| $T_f$ (° C.) | —34 | —35 | | | —26 | +12 |
| $T_{2000}$ (°C.) | +71 | +18 | | | +14 | +30 |
| Stiff Range (°C.) | 105 | 53 | | | 40 | 18 |
| Melting Point (°C.) | 118 | | | | | |

Terms used in the above table and elsewhere in the present specification are defined as follows:

$T_f$ (° C.), the temperature in degrees centigrade at which the Clash-Berg modulus is 135,000 p.s.i.

$T_{2000}$ (° C.), the temperature in degrees centigrade at which the Clash-Berg modulus is 2000 p.s.i.
Stiff range (° C.), the Stifflex range determined by $T_{2000}$ minus $T_f$.
25° C. modulus, the Clash-Berg modulus (ASTM D–1043–51), in p.s.i. at 25° C.
MMA, methyl methacrylate

Example 2

Utilizing the reactor of Example 1, ethylene and methyl acrylate were polymerized at 180–190° C., 30,000 p.s.i., with 60 weight parts per million of t-butyl perbenzoate and employing a contact time of 1.8 minutes. With methyl acrylate constituting 10% by weight of the monomer feed, the polymer product produced at 20% conversion contained 48% by weight of methyl acrylate polymerizate, while a 5% by weight methyl acrylate feed produces about 25% by weight methyl acrylate polymerizate at the same conversion. The product containing 48% by weight methyl acrylate had tensile strength, 130 p.s.i., elongation, 700%.

Example 3

Employing a ⅛ inch (internal diameter) reactor at 30,000 p.s.i., 160–200° C., about 60 weight parts per million t-butyl peracetate initiator and a 2 minute dwell time, ethylene and methacrylic acid were polymerized. With the methacrylic acid constituting 4% of the feed, at a conversion of 29%, the product contained 14% by weight of methacrylic acid polymerizate. The tensile strength was 2330 p.s.i.; elongation, 10%; melt index, 1.3 decigrams/minute; and density, 0.956, and the product was hard, rather than soft and rubbery.

Catalysts suitable for use in the present invention are those free radical catalysts which can be used in the high pressure polymerization of ethylene, examples of which are oxygen, peroxides, azo catalysts, and the like, for example, molecular oxygen, hydrogen peroxide, persuccinic acid, lauroyl peroxide, acetyl peroxide, tertiarybutyl peracetate, tertiarybutyl perbenzoate, alkali metal persulfates, perborates and percarbonates, azobisisobutyronitrile, etc. In addition to the foregoing free radical producing ethylene polymerization catalysts, it is possible, for example, to employ combinations of oxygen with trialkylboron or boron hydride as catalysts.

While it is generally preferred to operate the process of the present invention at elevated temperatures, atmospheric or lower temperatures are also operative, provided percarbonate, trialkylboron and oxygen, or other catalysts effective at lower temperatures are employed. Similarly, it is preferred to operate at high pressures, but lower pressures are satisfactory to a certain extent. For example, the process of the present invention, with the limitations set forth hereinabove, can be conducted at 0° to 250° C. and at pressures of 2,000 to 45,000 p.s.i. or higher.

What is claimed is:
1. The method of preparing heterogeneous copolymers of ethylene which comprises continuously polymerizing a mixture consisting of ethylene and a vinyl ester selected from the group consisting of methyl acrylate and methyl methacrylate in a tubular reactor with a free radical catalyst at a temperature of 150 to 250° C. under a pressure of 20,000 to 40,000 p.s.i., the said vinyl ester calculated as methyl methacrylate, constituting 6% to 20% by weight of the total monomer feed, for a time sufficient to convert at least 20% by weight of the monomer mixture to polymer, the resulting heterogeneous copolymer being characterized by being substantially crystalline and having a sharp melting point above 110° C. and a brittle temperature no higher than −20° C., and the said vinyl ester content, calculated as methyl methacrylate, of the copolymer being in the range of 6 to 25% by weight.
2. The method of claim 1 in which the compound of the formula is methylacrylate.
3. The method of claim 1 in which the compound of the formula is methyl methacrylate.
4. The method of claim 1 in which at least 30% by weight of the monomeric mixture is converted.

References Cited in the file of this patent

UNITED STATES PATENTS

| | | |
|---|---|---|
| 2,953,551 | White et al. | Sept. 20, 1960 |
| 2,956,995 | Knight | Oct. 18, 1960 |
| 2,960,496 | Elder | Nov. 15, 1960 |
| 2,985,633 | Welch | May 23, 1961 |

OTHER REFERENCES

Alfrey et al.: "Copolymerization" pages 105–121, Interscience, New York (1952), QD281 P6 A 5C.